US009183367B2

(12) United States Patent
Bao et al.

(10) Patent No.: US 9,183,367 B2
(45) Date of Patent: Nov. 10, 2015

(54) VOICE BASED BIOMETRIC AUTHENTICATION METHOD AND APPARATUS

(71) Applicant: INTERNATIONAL BUSINESS MACHINES CORPORATION, Armonk, NY (US)

(72) Inventors: Sheng Hu Bao, Beijing (CN); Min Li, Beijing (CN); Yong Qin, Beijing (CN); Zhong Su, Beijing (CN); Liu Wen, Beijing (CN); Shi Lei Zhang, Beijing (CN)

(73) Assignee: GLOBALFOUNDRIES U.S. 2 LLC, Hopewell Junction, NY (US)

( * ) Notice: Subject to any disclaimer, the term of this patent is extended or adjusted under 35 U.S.C. 154(b) by 0 days.

(21) Appl. No.: 14/291,059

(22) Filed: May 30, 2014

(65) Prior Publication Data

US 2014/0359739 A1    Dec. 4, 2014

(30) Foreign Application Priority Data

May 31, 2013 (CN) .......................... 2013 1 0210886

(51) Int. Cl.
*G06F 7/04* (2006.01)
*G06F 21/32* (2013.01)
(Continued)

(52) U.S. Cl.
CPC ............... *G06F 21/32* (2013.01); *G06F 21/46* (2013.01); *G10L 17/24* (2013.01); *G10L 17/02* (2013.01)

(58) Field of Classification Search
CPC ..................................................... G06F 21/32
USPC ............................................................ 726/7
See application file for complete search history.

(56) References Cited

U.S. PATENT DOCUMENTS 6,510,415 B1 *  1/2003  Talmor et al. ................. 704/273
8,255,223 B2    8/2012  Wang
(Continued)

FOREIGN PATENT DOCUMENTS

WO    WO-2012/075641 A1    6/2012

OTHER PUBLICATIONS

Nuance Communications, Inc., Nuance Vocalpassword™::Liveness Detection Using Voice Biometrics (Intra-Session Voice Variation)—Overview, 2011.

(Continued)

*Primary Examiner* — Teshome Hailu
(74) *Attorney, Agent, or Firm* — Scully, Scott, Murphy & Presser, P.C.

(57) ABSTRACT

Voice based biometric authentication method, apparatus (system), and computer program product. Provided is voice verification solution with a high accuracy rate that can prevent cheating via recording. The method includes: transmitting to the user a question prompt requiring the user to speak out a voice segment and an answer to a dynamic question, the voice segment having a corresponding text dependent speaker verification model enrolled before the authentication; segmenting, in response to receiving the voice answer, the voice segment part and the dynamic question answer part out from the voice answer; and verifying boundary smoothness between the voice segment and the answer to the dynamic question within the voice answer. With this method, whether a voice answer relates to cheating via recording is determined according to the degree of smoothness at a detected boundary. The apparatus and computer program product carry out the steps of the above-mentioned method.

20 Claims, 5 Drawing Sheets

(51) Int. Cl.
  *G10L 17/24* (2013.01)
  *G06F 21/46* (2013.01)
  *G10L 17/02* (2013.01)

(56) References Cited

U.S. PATENT DOCUMENTS

| | | | |
|---|---|---|---|
| 2006/0288225 A1* | 12/2006 | Jung et al. | 713/182 |
| 2007/0201443 A1* | 8/2007 | Saha et al. | 370/356 |
| 2008/0172230 A1* | 7/2008 | Hayakawa | 704/249 |
| 2012/0078624 A1 | 3/2012 | Yook et al. | |
| 2012/0130714 A1 | 5/2012 | Zelikovic et al. | |
| 2012/0284026 A1 | 11/2012 | Cardillo et al. | |
| 2013/0030809 A1 | 1/2013 | Farrell et al. | |

OTHER PUBLICATIONS

Bimbot et al., A Tutorial on Text-Independent Speaker Verification, EURASIP Journal on Applied Signal Processing, 2004, 430-451, 4, Hindawi Publishing Corporation, http://asp.eurasipjournals.com/content/pdf/1687-6180-2004-101962.pdf.

* cited by examiner

VOICE BASED BIOMETRIC AUTHENTICATION METHOD AND APPARATUS

CROSS-REFERENCE TO RELATED APPLICATION

This application claims priority under 35 U.S.C. §119 from Chinese Patent Application No. 201310210886.8 filed May 31, 2013, the entire contents of which are incorporated herein by reference.

BACKGROUND OF THE INVENTION

The present invention relates to user authentication. More specifically, the present invention relates to a voice based biometric authentication method and apparatus.

With the development of technology, users need to conduct a large amount of communication and internet based activities during work and everyday living. These internet based activities generally require user authentication in order to ensure security of the user's activities.

Password, as a traditional authentication approach, has the defect of being easily cracked, lost, and/or forgotten. To improve security in password authentication, UKey can also be used in a desktop or notebook to ensure security. However, this approach is difficult to apply to a hand-held mobile terminal or call center. More importantly, the foregoing approach has low personal relevance and a person who illegally acquires the above information can easily be regarded as the user himself/herself. Currently, there are many scenarios where it is required to confirm that an operation is made by the user himself/herself. Therefore, in order to enhance personal relevance in user authentication, authentication approaches utilizing biometric features such as fingerprint recognition, iris detection, face recognition, and sound recognition have been widely used and developed.

Speaker verification is a mainstream approach among current biometric information authentication approaches and generally includes two types of voiceprint recognition approaches: text dependent and text independent. Furthermore, voiceprint recognition also generally includes two steps: enrollment and verification. In text dependent voiceprint recognition, the same voice segment that is spoken in enrollment must also be spoken in verification. This approach has a high accuracy rate (i.e. above 99%) and the length of the voice segment employed in enrollment only needs to be several seconds. Text dependent voiceprint recognition can be easily applied and, thus, is a widely used voice authentication approach. However, since what is spoken is always the couple of sentences in the enrollment set and the voice is available to public, the voice is prone to be stolen via recording, which is then used to cheat the authentication system by a manner of playing back.

In text independent voiceprint recognition, what is spoken in verification can be different from that in enrollment. This approach can solve the problem of cheating via recording by providing a dynamic question during authentication. However, its accuracy rate is low (i.e. generally is about 70%). Thus, this approach cannot be fully put into practical use, especially in the user authentication field that requires a high accuracy rate (such as in banking, etc). Furthermore, in enrollment the user is required to speak out content that is at least several tens of seconds in length, which is not very convenient. Thus, in practical use, text independent voiceprint verification is hard to be taken as a standalone detection approach and is generally combined with other biometric feature authentication approaches. Thus, the application scope is limited.

In summary, there are still deficiencies in the prior art. What is urgently needed is a voice verification solution with a high accuracy rate that can prevent cheating via recording.

SUMMARY OF THE INVENTION

The present invention is proposed in view of the foregoing problems. The present invention provides a voice verification solution with a high accuracy rate that can prevent cheating via recording.

Accordingly, one aspect of the present invention provides a computer-implemented method for authenticating a user, wherein the computer includes: a memory; a processor communicatively coupled to the memory; and a user authentication module coupled to the memory and the processor, wherein the user authentication module is configured to perform the steps of a method including: transmitting to the user a question prompt requiring the user to speak out a voice segment part and an answer to a dynamic question part, wherein the voice segment part has a corresponding text dependent speaker verification model enrolled before an authentication; segmenting, in response to receiving a voice answer, the voice segment part and the answer to the dynamic question part out from the voice answer; and verifying a boundary smoothness between the voice segment part and the answer to the dynamic question part within the voice answer.

Another aspect of the present invention provides a user authentication system for authenticating a user, the user authentication system including: a memory; a processor communicatively coupled to the memory; and a user authentication module coupled to the memory and the processor, wherein the user authentication module is configured to perform the steps of a method comprising: transmitting to the user a question prompt requiring the user to speak out a voice segment part and an answer to a dynamic question part, wherein the voice segment part has a corresponding text dependent speaker verification model enrolled before an authentication; segmenting, in response to receiving a voice answer, the voice segment part and the answer to the dynamic question part out from the voice answer; and verifying a boundary smoothness between the voice segment part and the answer to the dynamic question part within the voice answer.

Another aspect of the present invention provides a non-transitory computer readable storage medium tangibly embodying a computer readable program code having computer readable instructions which, when implemented, cause a computer device to carry out the steps of a method for authenticating a user, the method including: transmitting to the user a question prompt requiring the user to speak out a voice segment part and an answer to a dynamic question part, wherein the voice segment part has a corresponding text dependent speaker verification model enrolled before an authentication; segmenting, in response to receiving a voice answer, the voice segment part and the answer to the dynamic question part out from the voice answer; and verifying a boundary smoothness between the voice segment part and the answer to the dynamic question part within the voice answer.

With the method, apparatus (system), and computer program product according to the above aspects of the present invention, it can be recognized whether a voice answer relates to cheating via recording according to smoothness at the detection boundary.

BRIEF DESCRIPTION OF THE DRAWINGS

Through the more detailed description of some embodiments of the present invention and the accompanying drawings, the above and other objects, features, and advantages of the present invention are made more apparent. The same reference generally refers to the same components in the embodiments of the present invention.

DETAILED DESCRIPTION OF THE PREFERRED EMBODIMENT

Figure 1:
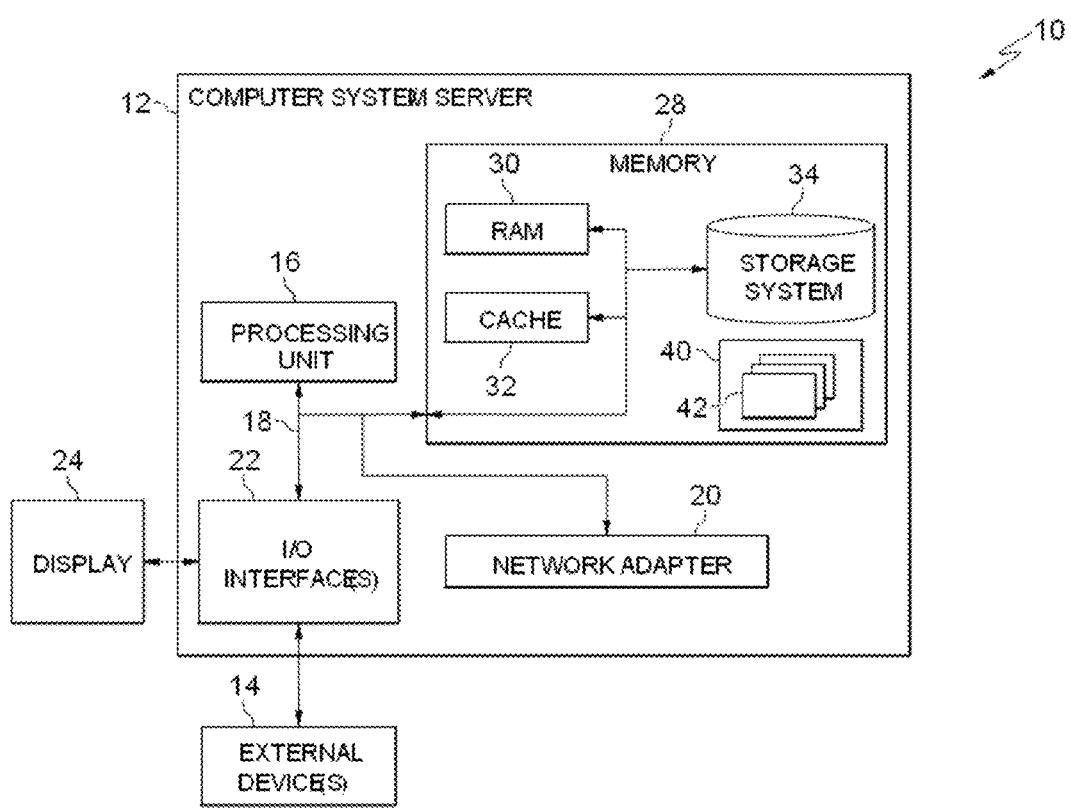
FIG. 1 is a block diagram of an exemplary computer system/server 12 which is applicable to implement the embodiments of the present invention.

Some preferable embodiments of the present invention are described in more detail with reference to the accompanying drawings, in which the preferable embodiments of the present invention have been illustrated. However, the present invention can be implemented in various manners and cannot be construed to be limited to the embodiments disclosed herein. On the contrary, those embodiments are provided for the thorough and complete understanding of the present invention and for completely conveying the scope of the present invention to those skilled in the art.

As can be appreciated by one skilled in the art, aspects of the present invention can be embodied as a system, method, or computer program product. Accordingly, aspects of the present invention can take the form of an entirely hardware embodiment, an entirely software embodiment (including firmware, resident software, micro-code, etc.), or an embodiment combining software and hardware aspects that can all generally be referred to herein as a "circuit," "module," or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium including, but not limited to, wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It can be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Refer now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the present invention described herein.

As shown in FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12 and it includes both volatile and non-volatile media and removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As further depicted and described below, memory 28 can include at least one program product having a set (e.g., at least one) of program modules that are configured to carry out the functions of embodiments of the present invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It can be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Figure 2:
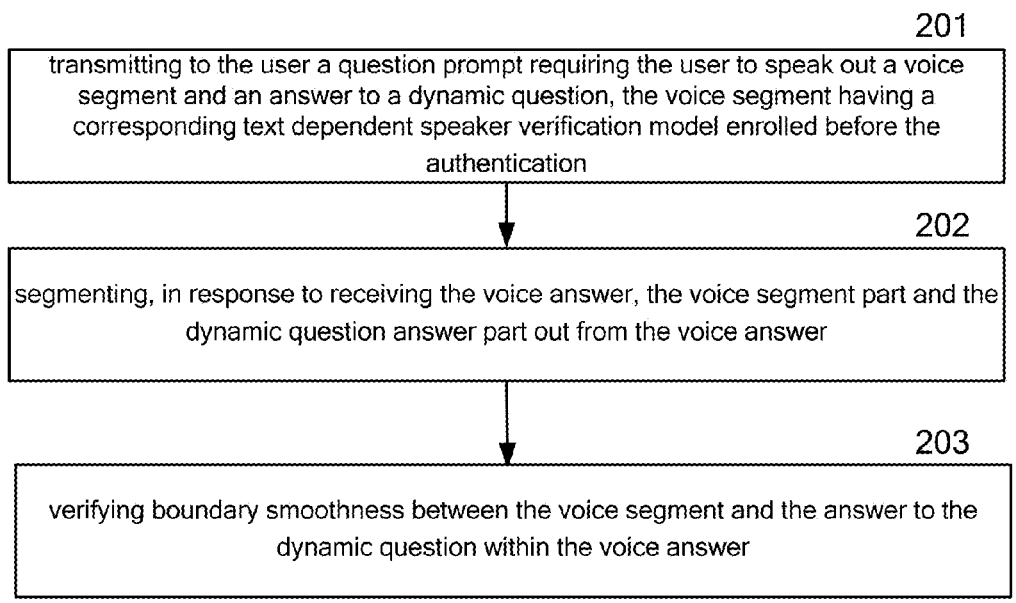
FIG. 2 is a flowchart of a user authentication method according to an embodiment of the present invention.

In the following, a user authentication method according to an embodiment of the present invention is described with reference to FIG. 2. As shown in FIG. 2, in step 201, transmitting to the user a question prompt requiring the user to speak out a voice segment and an answer to a dynamic question, the voice segment having a text dependent speaker verification model enrolled before the authentication.

By applying a dynamic question, the user will not know what to answer until authentication, which to some extent can prevent an illegal user from knowing what to record in advance. The type of dynamic question is not limited as long as the user can answer the question via voice. Those skilled in the art can select from any existing questions as needed.

A voice segment is what is spoken by the user in voice authentication registration, which can be any type of word, phrase, or sentence and is used to enroll a text dependent speaker verification model before authentication.

At the enrollment stage, how to enroll a text dependent speaker verification model according to the user's voice segment belongs to fully developed prior art and the detailed implementation of which is omitted here. There can be one or more voice segments, each having a corresponding text dependent speaker verification model which is stored in advance.

The text dependent speaker verification model can be determined by employing any existing text dependent speaker verification technology. In an embodiment of the present invention, a template matching method can be used. That is, feature vectors capable of describing features of the speaker are extracted from voice segments spoken by the speaker as enrollment sentences during enrollment to form a feature vector sequence as the text dependent speaker verification model. Further, it can also be optimized to get a set of feature vectors to efficiently represent that feature vector sequence and this set is taken as the text dependent speaker verification model so as to be used as a reference template during subsequent verification. During verification, voice segments to be verified are handled in the same way to extract feature vector sequence which is compared with all reference templates according to a certain matching rule. Matching is often realized by distance measurement among feature vectors and accumulated distance is taken as matching result. The most common template matching methods in speaker verification include Dynamic Time Warping (DTW) and Vector Quantization (VQ) methods etc.

In another embodiment of the present invention, a model probability method can also be used. That is, during enrollment, on the basis that effective feature vectors are extracted from one's voice segments which have been registered for one or more times, a corresponding model is established for him/her and finally matching is performed by relying on the resulting text dependent speaker verification model, thereby achieving the purpose of verification. Wherein, the most common model is Hidden Markov Model (HMM), which can describe smoothness and variability of voice signals quite good and can accurately describe variation characteristics of a human's sound track. In addition, a speaker verification model for voice segments upon user registration can be determined based on an artificial neural network method, which belongs to prior art and the description of which is omitted.

In consideration of convenience in user registration, the number of registered voice segments should not be too large. When there are many pre-registered voice segments, a dynamic problem can also be designed to randomly select one of these voice segments and require the user to repeat it.

In an improved embodiment of the present invention, the question prompt requires the user to speak out the voice segment and the answer to the dynamic question in a preset order. The preset order is in what order the user is required to speak out the voice segment and the answer to the dynamic question. The preset order can be selected from one of the following: the voice segment being located before the answer; the voice segment being located after the answer; and the voice segment intersecting with the answer.

For example, assuming that a voice segment enrolled in advance is "zhang san", the dynamic question is "what equals to 4 plus 8," the preset order is that the answer to the dynamic question is located within the voice segment. Then, the final question prompt is "please speak out your full name and insert result of 4 plus 8 after your surname?," which requires the user to speak out "zhang twelve san" by voice.

There can be a variety of manners in providing a question prompt and one can select from manners such as word, pattern, voice, video etc. For example, in case of a call center, the question prompt can be played back by a manner of speech synthesis. In the case of a mobile terminal, by either speech synthesis or image, a word can be employed to present the question prompt to a user.

In step 202, segmenting, in response to receiving the voice answer, the voice segment part and the dynamic question answer part out from the voice answer. The voice answer for authenticating the user is a length of audio data. However, for the voice segment part repeated by the user, a text dependent speaker verification model needs to be used and for the dynamic question answer part, voice based recognition technology needs to be used to verify whether the answer is correct. Since different verification technologies are involved, segmentation needs to be performed on the voice answer so as to acquire the voice segment part and the dynamic question answer part therefrom.

If position relationship between the voice segment and the answer to the dynamic question has been known when designing a question, the voice segment part can be segmented more accurately by means of this information and based on existing voice segmentation technology. Then the remaining part is just the dynamic question answer part.

It is noteworthy that when the answer part is located within the voice segment, the segmented voice sub-segments also need to be combined to acquire a voice segment to be verified. For example, three parts which are "zhang," "twelve," and "san" are segmented from "zhang twelve san," then by joining "zhang" and "san" together, the voice segment to be verified can be acquired. The joining technology can simply synthesize two voice sub-segments into one audio file or further perform some smoothness processing thereon.

In step 203, verifying boundary smoothness between the voice segment and the answer to the dynamic question within the voice answer. It can be determined through boundary smoothness whether acoustical naturalness and smoothness can be reached at boundary, such that cheating via recording can be identified. When an illegal user attempts to conduct cheating via recording, he/she can only simulate a voice answer of a legal user spoken in a preset order by performing "pause" and "play" operations in playing the recording and incorporating the voice answer of that illegal user. Thus, the received voice answer of the illegal user is actually made up of a recording of the voice segment and the voice answer of the illegal user. Therefore, there is necessarily an unnatural boundary transition in the whole voice answer and cheating via recording is made very difficult. As such, by detecting boundary smoothness in this step, it can be accurately determined whether the voice answer is related to cheating via recording.

Smoothness of voice boundary has been involved in existing text to speech technology, which is mainly used to make the synthesized voice more natural. However, the prior art has never used smoothness detection to determine whether a segment of voice is formed by joining segments together and applied it to user authentication procedure. Specifically, the determination can be made via features such as energy, pitch, and spectrum. The applicant describes the three exemplary features in FIG. 3, FIG. 4, and FIG. 5. Based on the information disclosed by the present application, those skilled in the art can employ one of them or use them in combination.

For the convenience of user's voice answer, in an improved embodiment of the present invention, the applicant further improves the question's design method such that the "voice segment" can be naturally joined with an answer to the dynamic question and will not cause difficulty in user's pronunciation (in which difficulty in user's pronunciation can reduce accuracy of voice authentication).

Alternatively, the flowchart shown in FIG. 2 can also include a step of verifying the voice segment part according to the text dependent speaker verification model. Any existing text dependent speaker verification technology can be employed for verifying and since it belongs to prior art and has been accordingly described in the description of step 201, it is omitted here for brevity.

Alternatively, the flowchart shown in FIG. 2 can also include a step of performing answer verification on the dynamic question answer part. Any existing voice recognition technology can be used to verify whether an answer to the dynamic question is correct. In an embodiment of the present invention, voice recognition technology having a large vocabulary is used to recognize the voice answered by the user into words, which are then compared against answer to the question to see whether they are correct. In another embodiment, text of an answer to the question and voice spoken by the user can be directly used to conduct "alignment of voice and text" and it is a correct answer if they can be aligned. Since verifying an answer to a question based on voice recognition technology belongs to prior art, the details are omitted here for brevity.

Those skilled in the art can appreciate that, for the three types of authentication (verification on boundary smoothness, speaker verification on voice segment, and answer verification on dynamic answer) user authentication will fail if either of them fails, as such, order of the three types of authentication is adjustable.

Figure 3:
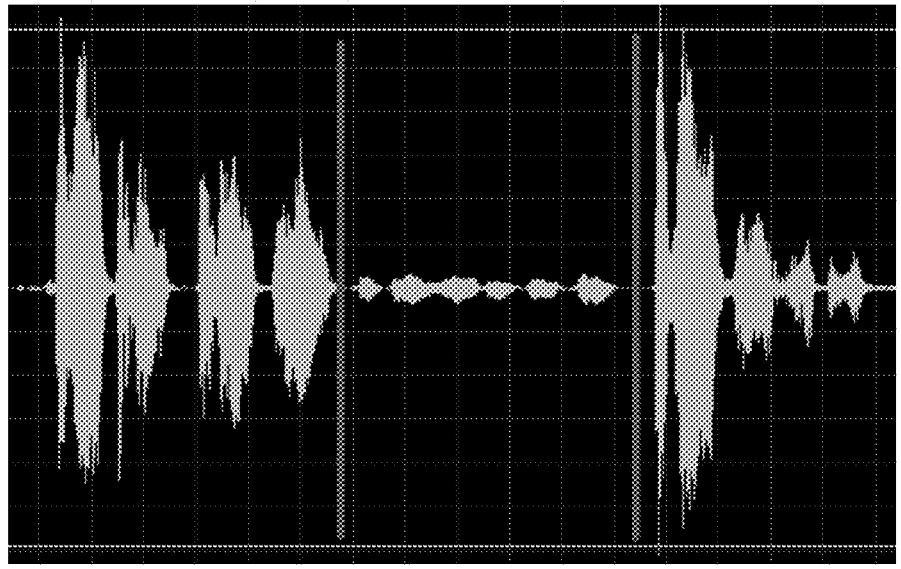
FIG. 3 shows an embodiment of energy-based boundary smoothness detection according to an embodiment of the present invention.

FIG. 3 shows energy-based boundary smoothness detection according to an embodiment of the present invention. Generally, pieces of joined voice cannot be joined very well in energy. In the example shown in FIG. 3, there is serious disjointment in energy between the voice in the middle and the voice at two sides (shown by demarcation lines). Thus, it can be easily seen that the boundary is not smooth from the perspective of energy.

In an embodiment of the present invention, a sliding window is used to determine whether energy at the voice boundary is smooth in performing boundary detection according to energy. Specifically, an average energy value of the voice is calculated in a sliding window (such as a time window of 1s), if it is a mute window, then the value is discarded. When there is an abrupt change in average energy value and this abrupt change is maintained for a certain amount of time, the boundary is considered as not being smooth.

Figure 4:
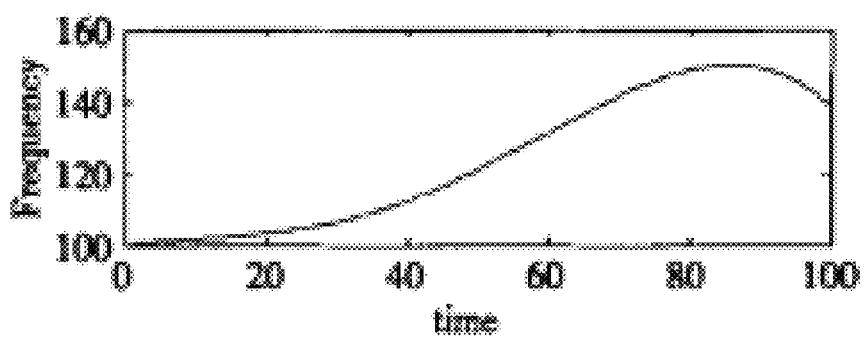
FIG. 4 and FIG. 5 show pitch-based boundary smoothness detection according to an embodiment of the present invention.
Figure 5:
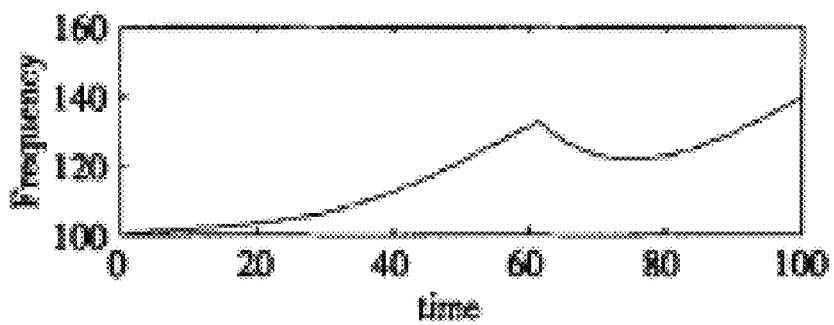

FIG. 4 and FIG. 5 show pitch-based boundary smoothness detection according to an embodiment of the present invention, wherein the unit of horizontal axis is in seconds and the unit of vertical axis is in hertz.

Tone feature can easily reflect the condition of voice boundary, while tone feature can be described by pitch. One main feature of voice recognition is the type of excitation. Depending on the type of excitation, a voice signal can be classified into voiced and unvoiced sound. In a piece of speech, only voiced sound has pitch and excitation of voiced sound is a periodic pulse string, the frequency of which is pitch.

Actually, pitch change of normal intonation is continuous. That is, after performing pitch extraction on each frame of voice, what is plotted can be like that shown in FIG. 4. However, if voice is joined, pitch of intonation will change abruptly, as shown in FIG. 5. In an embodiment of the present invention, whether envelope of pitch curve is continuous can be used to determine whether there is any jump in pitch. In this embodiment, Δ of pitch curve is calculated (i.e. tangent line of the curve) to check whether the intersection angle of two continuous and adjacent tangent lines is lower than a threshold. If it is higher than this threshold, it is considered that there is a jump in pitch.

Spectrum based boundary smoothness detection can also be performed. Spectrum is a distribution curve of frequency. Complex oscillation can be decomposed into harmonic oscillations having different amplitudes and different frequencies and the pattern formed by arranging amplitudes of these harmonic oscillations in frequency order is called spectrum. Signal is in time domain, thus Fast Fourier Transformation (FFT) can be conducted on the signal to convert the signal into frequency domain. Similarly, spectrum of normal voice is continuous so whether the envelope is continuous can also be checked to determine whether voice boundary is smooth.

Next, the applicant describes in detail an embodiment improved for step 201. In this improved embodiment, the voice segment is enrolled in advance and the answer to the dynamic question is made to have pronunciation consistency therebetween. For example, what is said by the user in enrollment is "hu bei sheng yi chang shi," the dynamic question is "what equals to 2 plus 2," and when the preset order is that the voice segment being located before the answer, the user finally needs to answer "hu bei sheng yi chang shi si." Obviously, it is rather unnatural to read "hu bei sheng yi chang shi si" since the pronunciation of "shi" and "si" are very similar in Chinese. Also, "shi" is pronounced by a rolled tongue while "si" is pronounced by a flat tongue. This unnaturalness results in incoherence in the voice answer of the user and is prone to be regarded as cheating via recording in the boundary detection step. Thus, in an improved embodiment, in generating a question, the system needs to consider the degree of naturalness of the voice finally read by the user.

Smoothness can be considered from two perspectives: first, what appears frequently and continuously in a piece of text can be regarded as "natural;" and on the contrary, what appears infrequently can be regarded as "unnatural. For example, for "Mao ze dong" followed by "zhu xi (chairman)," such a combination appears frequently and is read rather naturally. However, for "Zhou en lai" followed by "zhu xi," it is rather hard to read such a combination because it cannot be said in such a way in our daily life. Such textual combination can be measured by a language model which records therein the probability that a word is followed by another word or some words. In an embodiment of the present invention, the language model can be an n-gram model enrolled by an existing language model tool such as Stanford Research Institute Language Modeling toolkit (SRILM) in prior art.

Secondly, what appears frequently and continuously in a syllable can be regarded as "natural;" and what otherwise does not can be regarded as "unnatural." For example, it can be difficult to read if "shi" in "hu bei yi chang shi" is followed by "si." However, if "shi" is followed by "san," they can be read more smoothly than the former. Such syllable combination can be measured by an acoustic model. The acoustic model can be a simple table recording therein probability that all phonemes are combined with another phoneme; and the acoustic model can also be a decision tree by which probability that a certain syllable is followed by another syllable or several syllables can be determined. In an embodiment of the present invention, enrollment can be conducted by using an annotated acoustic model enrollment library, such as an acoustic model enrollment library created according to voice database standard of Linguistic Data Consortium (LDC).

Figure 6:
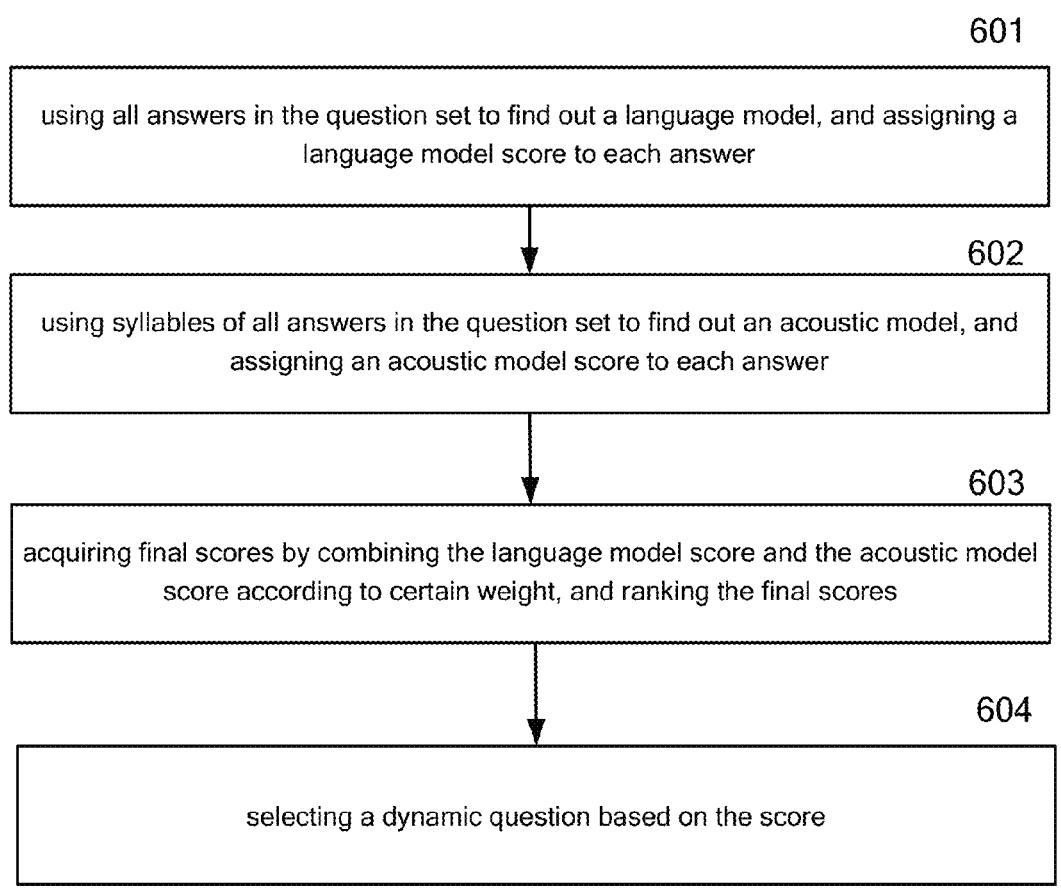
FIG. 6 shows detailed steps for generating questions according to an embodiment of the present invention.

FIG. 6 shows detailed steps for generating questions in an embodiment of the present invention. In order to describe the embodiment clearly, the example of "hu bei sheng yi chang shi" is used for the explanation. The user is required to insert an answer of a question after "hu bei sheng" but before "yi chang shi." There is a large question set in the system in which each question corresponds to an answer. Some questions are general questions (such as "what equals to 2+2," "what day is today," etc.) and some are user specific questions (such as "what is the name of your high school," "what is the name of your mother," etc.). To make the voice segment enrolled in advance and the answer to the dynamic question possess pronunciation consistency therebetween, the system needs to find out a most suitable dynamic question from all the question sets.

In an embodiment of the present invention, the question set includes the following questions and corresponding answers:
Question 1: "what equals to 4 minus 3?" Answer: "1."
Question 2: "what is the name of your high school?" Answer: "di yi zhong xue (No. 1 middle school)."
Question 3: "what is the last letter in the 26 letter English alphabete?" Answer: "z."

In step 601, using all answers in the question set to find out a language model and assigning a language model score to each answer. Since this answer needs to be located between two words, there is a left score and a right score. The language model score is average of the two scores. The higher the score, the easier in reading. The score of "1" is 0.06, the score of "di yi zhong xue" is 0.55, and the score of "z" is 0.0075, which indicates that, according to the language model, it can be determined that reading is easier if "di yi zhong xue" is inserted into the voice segment.

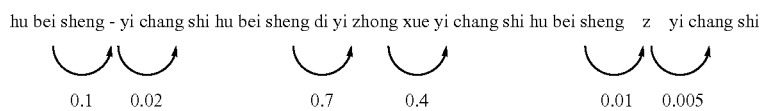

In step 602, using syllables of all answers in the question set to find out an acoustic model and assigning an acoustic model score to each answer. Similarly, the higher the score, the easier in reading. The score of "1" is 0.205, the score of "di yi zhong xue" is 0.35, and the score of "z" is 0.255, which also indicates that, according to the acoustic model, it can be determined that reading is easier if "di yi zhong xue" is inserted into the voice segment.

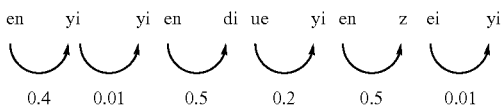

In step 603, optionally, acquiring final scores by combining the language model score and the acoustic model score according to certain weight and ranking the final scores. The higher the score, the easier in reading. For example, combination is conducted according to weights of 0.5 and 0.5, that is, the score of "1" is 0.06*0.5+0.205*0.5=0.1325, the score of "di yi zhong xue" is 0.55*0.5+0.35*0.5=0.45, and the score of "z" is 0.0075*0.5+0.255*0.5=0.13125, which indicates that, by synthesizing acoustic model and language model, it can be determined that reading is easier if "di yi zhong xue" is inserted into the voice segment.

In step 604, selecting a dynamic question based on the score. In an embodiment of the present invention, since the answer "di yi zhong xue" has the highest score, the finally selected question can be "the name of high school." After this question has been used, this question can be removed from the question set and then the remaining question set is ranked for selection.

Next, a user authentication apparatus according to an embodiment of the present invention is described with reference to FIG. 7. This apparatus can execute the method described above with reference to FIG. 2 through the following respective means.

Figure 7:
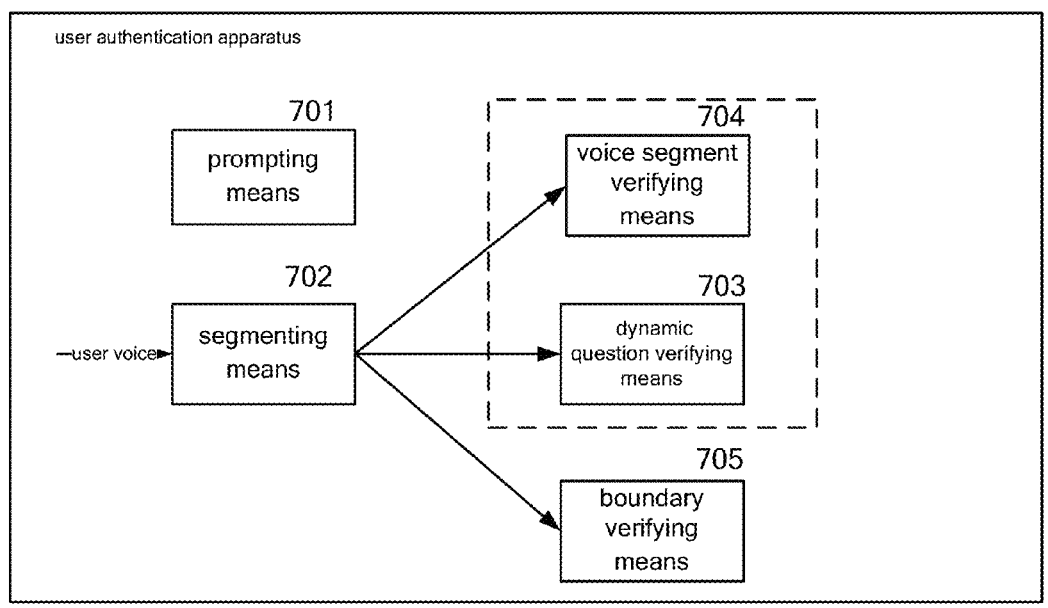
FIG. 7 is a block diagram of a user authentication apparatus according to an embodiment of the present invention.

As shown in FIG. 7, the user authentication apparatus can include the following parts, wherein a voice segment verifying means 703 and a dynamic question verifying means 704 surrounded by broken lines are optional. The apparatus includes:

a prompting means 701 configured to transmit to the user a question prompt requiring the user to speak out a voice segment and an answer to a dynamic question, the voice segment is used to enroll a text dependent speaker verification model before the authentication;

a segmenting means 702 configured to segment, in response to receiving the voice answer, the voice segment part and the dynamic question answer part out from the voice answer;

a voice segment verifying means 703 configured to determine whether the voice segment part is the sound of the user according to the text dependent speaker verification model;

a dynamic question verifying means 704 configured to determine whether the answer to the dynamic question answer part is correct; and a boundary verifying means 705 configured to verify boundary smoothness between the voice segment and the answer to the dynamic question within the voice answer.

In an embodiment of the present invention, the boundary verifying means 705 includes: means configured to determine the smoothness based on at least one of energy, pitch, and spectrum. In an embodiment of the present invention, the question prompt requires the user to speak out the voice segment and the answer to the dynamic question in a preset order.

In an embodiment of the present invention, the preset order is selected from one of the following: the voice segment being located before the answer; the voice segment being located after the answer; and the voice segment intersecting with the answer.

In an embodiment of the present invention, the voice segment intersecting with the answer includes: the answer being located within the voice segment; or the voice segment being located within the answer.

In an embodiment of the present invention, the segmenting means 702 is further configured to segment the voice segment part and the dynamic question answer part out from the voice answer according to the preset order.

In an embodiment of the present invention, the voice segment enrolled in advance and the answer to the dynamic question have pronunciation consistency therebetween.

In an embodiment of the present invention, the voice segment enrolled in advance and the answer to the dynamic question are made to have pronunciation consistency therebetween according to a voice model and a sound model.

With the above user authentication method and apparatus according to embodiments of the present invention, it can be recognized whether a voice answer relates to cheating via recording according to degree of smoothness at a detected boundary.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of code, which includes one or more executable instructions for implementing the specified logical function(s). Note that, in some alternative implementations, the functions noted in the block can occur out of the order noted in the figures. For example, two blocks shown in succession can, in fact, be executed substantially concurrently or the blocks can sometimes be executed in the reverse order, depending upon the functionality involved. Also note that each block of the block diagrams and/or flowchart illustration and combinations of blocks in the block diagrams and/or flowchart illustration can be implemented by special purpose hardware-based systems that perform the specified functions or acts or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for authenticating a user, wherein the computer includes:
 a memory;
 a processor communicatively coupled to the memory; and
 a user authentication module coupled to the memory and the processor, wherein the user authentication module is configured to perform the steps of a method comprising:

transmitting to the user a question prompt requiring the user to speak out a voice segment part and an answer to a dynamic question part, wherein the voice segment part has a corresponding text dependent speaker verification model enrolled before an authentication, and wherein the question prompt requires the user to speak out the voice segment part and the answer to a dynamic question part in a preset order;

segmenting, in response to receiving a voice answer, the voice segment part and the answer to a dynamic question part out from the voice answer; and verifying a boundary smoothness between the voice segment part and the answer to a dynamic question part within the voice answer.

2. The computer-implemented method according to claim 1, wherein the step of verifying the boundary smoothness between the voice segment part and the answer to a dynamic question part within the voice answer comprises:
determining the smoothness based on at least one of:
energy, pitch, and spectrum.

3. The computer-implemented method according to claim 1, wherein the voice segment part enrolled in advance and the answer to the dynamic question part have pronunciation consistency therebetween.

4. The computer-implemented method according to claim 1, further comprising:
determining whether the voice segment part is a sound of the user according to the text dependent speaker verification model; and
determining whether the answer to the dynamic question part is a correct answer.

5. The computer-implemented method according to claim 1, wherein the preset order is selected from one of:
the voice segment part being located before the answer to the dynamic question part;
the voice segment part being located after the answer to the dynamic question part; and
the voice segment part intersecting with the answer to the dynamic question part.

6. The computer-implemented method according to claim 5, wherein the voice segment part intersecting with the answer to the dynamic question part comprises:
the answer being located within the voice segment part; or
the voice segment part being located within the answer.

7. The computer-implemented method according to claim 6, wherein the voice segment part enrolled in advance and the answer to the dynamic question part are made to have pronunciation consistency therebetween according to a voice model and a sound model.

8. The computer-implemented method according to claim 1, further comprising:
segmenting the voice segment part and the answer to the dynamic question answer part out from the voice answer according to the preset order.

9. A user authentication system for authenticating a user, the user authentication system comprising:
a memory;
a processor communicatively coupled to the memory; and
a user authentication module coupled to the memory and the processor, wherein the user authentication module is configured to perform the steps of a method comprising:
transmitting to the user a question prompt requiring the user to speak out a voice segment and an answer to a dynamic question, wherein the voice segment has a corresponding text dependent speaker verification model enrolled before an authentication, and wherein the question prompt requires the user to speak out the voice segment part and the answer to a dynamic question part in a preset order;

segmenting, in response to receiving a voice answer, the voice segment part and the dynamic question answer part out from the voice answer; and verifying a boundary smoothness between the voice segment and the answer to the dynamic question within the voice answer.

10. The user authentication system according to claim 9, wherein the step of verifying the boundary smoothness between the voice segment part and the answer to a dynamic question part within the voice answer comprises:
determining the smoothness based on at least one of:
energy, pitch, and spectrum.

11. The user authentication system according to claim 9, wherein the voice segment part enrolled in advance and the answer to the dynamic question part have pronunciation consistency therebetween.

12. The user authentication system according to claim 9, wherein the method further comprises:
determining whether the voice segment part is a sound of the user according to the text dependent speaker verification model; and
determining whether the answer to the dynamic question part is a correct answer.

13. The user authentication system according to claim 9, wherein the preset order is selected from one of:
the voice segment part being located before the answer to the dynamic question part;
the voice segment part being located after the answer to the dynamic question part; and
the voice segment part intersecting with the answer to the dynamic question part.

14. The user authentication system according to claim 13, wherein the voice segment part intersecting with the answer to the dynamic question part comprises:
the answer being located within the voice segment part; or
the voice segment part being located within the answer.

15. The user authentication system according to claim 14, wherein the voice segment part enrolled in advance and the answer to the dynamic question part are made to have pronunciation consistency therebetween according to a voice model and a sound model.

16. The user authentication system according to claim 9, wherein the method further comprises:
segmenting the voice segment part and the answer to the dynamic question answer part out from the voice answer according to the preset order.

17. A non-transitory computer readable storage medium tangibly embodying a computer readable program code having computer readable instructions which, when implemented, cause a computer device to carry out the steps of a method for authenticating a user, the method comprising:
transmitting to the user a question prompt requiring the user to speak out a voice segment part and an answer to a dynamic question part, wherein the voice segment part has a corresponding text dependent speaker verification model enrolled before an authentication, and wherein the question prompt requires the user to speak out the voice segment part and the answer to a dynamic question part in a preset order;

segmenting, in response to receiving a voice answer, the voice segment part and the answer to a dynamic question part out from the voice answer; and verifying a boundary smoothness between the voice segment part and the answer to a dynamic question part within the voice answer.

18. The non-transitory computer readable storage medium according to claim 17, wherein the step of verifying the boundary smoothness between the voice segment part and the answer to a dynamic question part within the voice answer comprises:
 determining the smoothness based on at least one of: energy, pitch, and spectrum.

19. The non-transitory computer readable storage medium according to claim 17, wherein the voice segment part enrolled in advance and the answer to the dynamic question part have pronunciation consistency therebetween.

20. The non-transitory computer readable storage medium according to claim 17, wherein the method further comprises:
 determining whether the voice segment part is a sound of the user according to the text dependent speaker verification model; and
 determining whether the answer to the dynamic question part is a correct answer.

\* \* \* \* \*